Sept. 3, 1940.   H. C. GAMBLE   2,213,391
MULTIPLE BUBBLE BLOWER
Filed May 31, 1938
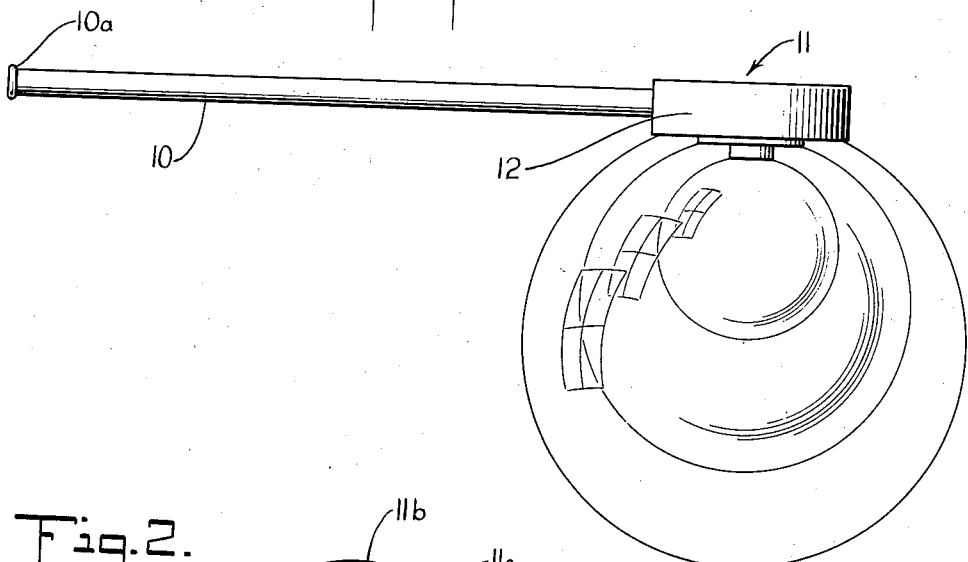
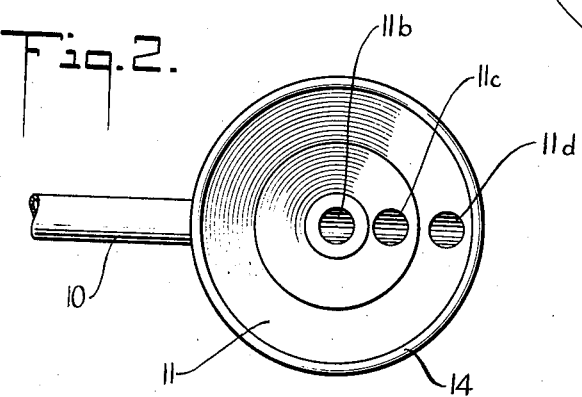
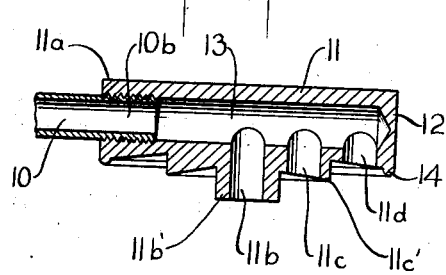
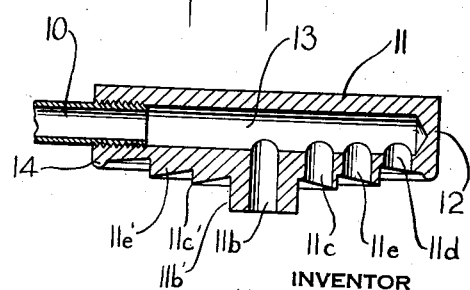
INVENTOR
Helen C. Gamble
BY
HER ATTORNEY Patented Sept. 3, 1940

2,213,391

UNITED STATES PATENT OFFICE 2,213,391

MULTIPLE BUBBLE BLOWER

Helen C. Gamble, New York, N. Y.

Application May 31, 1938, Serial No. 211,005

1 Claim. (Cl. 46—6)

My present invention relates to bubble-blowers comprising multiple bubble forming openings.

More particularly, my invention is directed to a blower capable of low cost manufacture and embodying an arrangement of multiple discharge openings insuring great success of substantially simultaneous multiple bubble formation and bubbles of maximum respective sizes and lengths of "life."

Specifically, the blower body is preferably of circular contour, the discharge openings having preferably uniform diameters of opening, arranged in radial alignment, the paths of flow of the air being substantially equal, and the facial areas about the respective discharge openings being "dished," with or without peripheral bead formation. Thereby a product of low cost and certainty of operation is had.

Further features and objects of the invention will be more fully understood from the following detail description and the accompanying drawing, in which Fig. 1 is a side elevation of one preferred embodiment of the invention, illustrating also a view of multiple soap bubbles generated respectively one within another in the use of the shown embodiment.

Fig. 2 is a bottom plan view of the embodiment shown in Fig. 1, the pipe stem being broken away.

Fig. 3 is a central sectional view of a simplified form of construction illustrated in Figs. 1 and 2.

Fig. 4 is a central sectional view of another embodiment of the invention.

Referring to Figs. 1, 2 and 3, the bubble blower comprises a pipe stem 10 which has a bore 10b. One end 10a of the pipe stem is adapted, as by the provision of a bead, to facilitate support in the mouth of the operator, the other end of the pipe stem being arranged to be securely inserted, as by the indicated mating threading, in the entry opening 11a of the blower per se 11.

The blower per se is conveniently of wood and preferably constructed by simple wood-turning and boring operations. As shown in Figs. 1, 2 and 3, three discharge openings 11b, 11c and 11d are formed in the effective, i. e. lower face of the wooden body 11, which preferably has a circular contour.

Such discharge openings 11b, 11c and 11d may, as shown, be arranged in radial alignment, the opening 11b being disposed at the center, the next opening 11c approximately mid-radially and the radially outermost opening 11d closely adjacent but spaced from the circular periphery 12, such openings communicating with the common bore 13. The common bore 13, as is illustrated, advantageously has a greater diameter than the diameter of the discharge openings.

Preferably, as shown a bead, see 14, is formed at the circular periphery 12 on the effective, i. e., lower, face of the blower body, which serves to effectively increase the capacity of the face to receive soap-containing water or like bubble-producing fluid when immersed in a body of such fluid and to retain the same when withdrawn therefrom in inverted, i. e., downwardly facing position.

Such bead 14 serves also as an effective anchorage for the outer margin of the bubble or bubbles during and after the air blowing operation.

Further, in the employment of radially spaced discharge openings, such as the radially aligned openings 11b, 11c and 11d, of substantially equal diameter of opening, as shown in Figs. 1, 2 and 3, it is preferable for attaining a high average of success of simultaneous bubbles at all three openings, to provide substantially equal lengths of paths of air flow for each opening, the lengths of such paths being measured from inlet opening 11a through the common bore 13 to the termini of the respective discharge openings 11b, 11c, 11d. Accordingly the central opening 11b is provided with the longest bore, the intermediate opening 11c with a bore of relatively lesser length, and the most remote opening 11d with a bore of relatively least length.

Such structure is also coordinated in the stated relationship by providing the circular enlargement 11b' of maximum length for the walls of the central opening 11b, the circular enlargement 11c' of lesser length—and also greater diameter—for the intermediate opening 11c, the terminus of the radially outermost opening 11d being substantially coincident with the effective face of the body 11.

Preferably, also, the annular face portion of the body 11 coincident with the terminus of the discharge opening 11d, and also the annular face of the enlargement 11c' are "dished," to thereby increase their respective facial areas, and to give rise to a bead formation.

The embodiment shown in Fig. 4 possesses structure and functional characteristics similar to those of the embodiment shown in Figs. 1, 2 and 3, and like parts are designated by llike reference characters. The embodiment shown in Fig. 4 particularizes the employment of a second intermediate discharge opening designated 11e, and a corresponding enlargement 11e' on the effective face of the bubble-blower body 11, and correspondingly "dished" at its annular face.

The multiple bubbles illustrated in Fig. 1, one bubble within the other, indicate success in bubble blowing readily attained by even the uninitiated.

Whereas I have described my invention by reference to specific forms thereof, it will be understood that many changes and modifications may be made without departing from the spirit of the invention.

I claim:

In a bubble blower, a solid substantially circular body having one surface forming a series of substantially concentric steps which lead successively upwardly toward the center of said body; a substantially rectilinear air flow passage formed through said body, said rectilinear air flow passage being open at one end, closed at the opposite end, and traversing almost the entire diametrical width of said body below the said series of steps; and a series of air flow passages formed through said body substantially perpendicular to said rectilinear air flow passage, said series of air flow passages comprising individual air flow passages which each open intermediate a respective one of the said steps, the shortest of said individual air flow passages being disposed farthest from the opening of said rectilinear air flow passage, and the remaining individual air flow passages of said series being of increased individual lengths as the center of said body is approached, all of said individual air flow passages lying within that semi-circular portion of said body which is farthest disposed from the opening of said rectilinear air flow passage.

HELEN C. GAMBLE.